US 12,546,413 B2

(12) United States Patent
    Noguchi

(10) Patent No.: US 12,546,413 B2
(45) Date of Patent: Feb. 10, 2026

(54) RESIDUAL PRESSURE EXHAUST AIR CIRCUIT AND RESIDUAL PRESSURE EXHAUST VALVE

(71) Applicant: SMC CORPORATION, Tokyo (JP)

(72) Inventor: Kazuhiro Noguchi, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 288 days.

(21) Appl. No.: 18/359,413

(22) Filed: Jul. 26, 2023

(65) Prior Publication Data
    US 2024/0044421 A1    Feb. 8, 2024

(30) Foreign Application Priority Data
    Aug. 3, 2022 (JP) ................. 2022-124192

(51) Int. Cl.
    *F16K 37/00*    (2006.01)
    *F16K 11/22*    (2006.01)
    *F16K 11/24*    (2006.01)

(52) U.S. Cl.
    CPC .......... *F16K 37/0091* (2013.01); *F16K 11/22* (2013.01); *F16K 11/24* (2013.01)

(58) Field of Classification Search
    CPC .... F16K 39/022; F16K 11/22; F15B 13/0431; F15B 2211/30565
    See application file for complete search history.

(56) References Cited

U.S. PATENT DOCUMENTS

2014/0261709 A1* 9/2014 Frazier ................. F15B 11/068
                                                              137/489.5
2023/0417262 A1* 12/2023 Enzaki ................... F15B 11/06

FOREIGN PATENT DOCUMENTS

WO    WO 2020/025766        2/2020
WO    WO-2020025766 A1 *    2/2020 ............. F15B 20/00
(Continued)

OTHER PUBLICATIONS

Supplemental European Search Report issued on Jan. 2, 2024 in European application 23184056.2, 20 pgs.

*Primary Examiner* — Nathaniel J Kolb
(74) *Attorney, Agent, or Firm* — Oblon, McClelland, Maier & Neustadt, L.L.P.

(57) ABSTRACT

[Object] To make it possible to detect, with a single pressure sensor, a malfunction of two solenoid valves for switching flow paths and to quickly and reliably exhaust residual pressure in an air device through a solenoid valve.
[Solution] A residual pressure exhaust air circuit 1 includes: a main flow path 9 through which air from an air source 2 is supplied to an air cylinder 100; an exhaust flow path 10 through which air in the air cylinder 100 is exhausted; a first sensor 8 for detecting a malfunction of solenoid valves 12, 13; a detection flow path 11 through which air from the air source 2 is supplied to the first sensor 8; and the two solenoid valves 12, 13 that switch communication states among the main flow path 9, the exhaust flow path 10, and the detection flow path 11. The two solenoid valves 12, 13 are formed of two-position valves having first positions 12a, 13a at the time of OFF and second positions 12b, 13b at the time of ON and are synchronously ON/OFF controlled. When the two solenoid valves 12, 13 do not operate in synchronization with each other, the air from the air source 2 is supplied to the first sensor 8 to detect a malfunction of the two solenoid valves 12, 13, and at the same time, the air in the air cylinder 100 is exhausted through the solenoid valve 12, 13.

10 Claims, 13 Drawing Sheets

(56) References Cited

FOREIGN PATENT DOCUMENTS

WO     WO 2022/107540     5/2022
WO     WO-2022107540 A1 *   5/2022    ......... G05D 16/2033

* cited by examiner

RESIDUAL PRESSURE EXHAUST AIR CIRCUIT AND RESIDUAL PRESSURE EXHAUST VALVE

TECHNICAL FIELD

The present invention relates to a residual pressure exhaust air circuit and a residual pressure exhaust valve capable of detecting a malfunction of a solenoid valve and exhausting residual pressure in an air device, such as an air cylinder, when the solenoid valve in the air circuit for controlling the air device malfunctions and the air device stops.

BACKGROUND ART

As shown in FIG. 14, a known air circuit detects a malfunction of a solenoid valve and exhausts residual pressure in an air device when the solenoid valve in the air circuit for controlling the air device, such as an air cylinder, malfunctions and the air device stops. This known air circuit is formed by connecting two three-port solenoid valves 73 and 74 with limit switches 76 in an air line 72 connecting an air source 70 and an air device 71. When one of the solenoid valves 73 and 74 fails and does not operate normally during operation of the air device, the failure is detected by the limit switch 76 and the other solenoid valve 74 or 73 is turned off, so that the residual pressure in the air device is exhausted to ensure the safety.

However, in this known air circuit, because failure of the two solenoid valves 73 and 74 is mechanically detected by the limit switches 76 attached thereto, detection signals are compared to each other, and control, such as turning off the other solenoid valve with a control device 75, such as a sequencer or the like, is performed, it is necessary to use solenoid valves with limit switches, and at the same time, the sequencer and a control program therefor are required. Thus, there has been problems in that the equipment cost is high and in that an engineer who is familiar with the safety function and the sequencer program must be obtained.

SUMMARY OF INVENTION

Technical Problem

A technical object of the present invention is to provide a residual pressure exhaust air circuit and a residual pressure exhaust valve capable of detecting a malfunction (operation inconsistency) of two solenoid valves with a single pressure sensor without using a solenoid valve with a limit switch, and capable of quickly and reliably exhausting residual pressure in an air device through a solenoid valve.

Solution to Problem

In order to solve the above-described problem, the present invention provides a residual pressure exhaust air circuit including: a main flow path through which air from an air source is supplied to an air cylinder; an exhaust flow path through which air from the air cylinder is exhausted; a detection flow path through which air from the air source is supplied to a first sensor; two solenoid valves that switch the communication states of the main flow path, the exhaust flow path, and the detection flow path, and the first sensor for detecting a malfunction of the two solenoid valves by the action of air.

The residual pressure exhaust air circuit is configured such that the two solenoid valves are two-position valves having first positions at the time of OFF and second positions at the time of ON and are synchronously ON/OFF controlled, when the two solenoid valves are both at the first positions, the main flow path is shut off so that the supply of air to the air cylinder is stopped, and the air cylinder and the detection flow path are connected to the exhaust flow path to bring the air cylinder and the detection flow path to an exhaust state, when the two solenoid valves are both at the second positions, the main flow path is in a communicating state so that the air from the air source is supplied to the air cylinder through the main flow path, and the exhaust flow path and the detection flow path are shut off so that the exhaust of air from the air cylinder through the exhaust flow path and the supply of air to the first sensor through the detection flow path are stopped, and when one of the two solenoid valves is at the first position and the other is at the second position, the main flow path is shut off so that the supply of air to the air cylinder is stopped, the exhaust flow path is connected to the air cylinder so that the air from the air cylinder is exhausted through the exhaust flow path, and the detection flow path is connected to the air source so that the air from the air source is supplied to the first sensor, whereby operation inconsistency between the two solenoid valves is detected as a malfunction by the first sensor.

The present invention may be configured such that a soft start valve is connected to the main flow path, and the soft start valve is formed by connecting, in parallel, a switching valve operated by air and a throttle valve for limiting a flow rate of air and soft-starts the air cylinder by supplying air with limited flow rate to the air cylinder through the throttle valve when the two solenoid valves are both turned on and the air source and the air cylinder are connected through the main flow path, and, when a part of the air in the main flow path is fed back to the switching valve, the switching valve is switched, and the air from the air source is supplied to the air cylinder in a free flow state.

Furthermore, in the present invention, it is desirable that one of the two solenoid valves be a first solenoid valve connected to the main flow path at a position closer to the air source, and the other be a second solenoid valve connected to the main flow path at a position closer to the air cylinder, and that the exhaust flow path be configured to exhaust the air in the air cylinder through the second solenoid valve when the first solenoid valve fails and to exhaust the air in the air cylinder through the first solenoid valve via the second solenoid valve when the second solenoid valve fails.

In the present invention, a second sensor for detecting the pressure of the air to be supplied to the air cylinder and a pressure gauge for indicating the pressure of the air may be connected to the main flow path.

Furthermore, the present invention provides a residual pressure exhaust valve configured such that a housing is provided with an input port connected to an air source, an output port connected to an air cylinder, an exhaust port open to the outside, a main flow path connecting the input port and the output port, an exhaust flow path connecting the output port and the exhaust port, a detection flow path connecting the input port and a first sensor, the first sensor for detecting a malfunction of two solenoid valves by the action of air supplied through the detection flow path, the two solenoid valves for switching the communication states of the main flow path, the exhaust flow path, and the detection flow path, and a soft start valve for soft-starting the air cylinder.

The residual pressure exhaust valve is configured such that the two solenoid valves are two-position valves having first positions at the time of OFF and second positions at the time of ON and are synchronously ON/OFF controlled, when the two solenoid valves are both at the first positions, the main flow path is shut off so that the supply of air to the air cylinder is stopped, and the air cylinder and the detection flow path are connected to the exhaust flow path so that the air cylinder and the detection flow path are in an exhaust state, when the two solenoid valves are both at the second positions, the main flow path is in a communicating state so that the air from the air source is supplied to the air cylinder through the main flow path, and the exhaust flow path and the detection flow path are shut off so that the exhaust of air from the air cylinder through the exhaust flow path and the supply of air to the first sensor through the detection flow path are stopped, and when one of the two solenoid valves is at the first position and the other is at the second position, the main flow path is shut off so that the supply of air to the air cylinder is stopped, the exhaust flow path is connected to the air cylinder so that the air in the air cylinder is exhausted through the exhaust flow path, and the detection flow path is connected to the air source so that the air from the air source is supplied to the first sensor, whereby operation inconsistency between the two solenoid valves is detected as a malfunction by the first sensor.

In the present invention, the housing may be provided with a second sensor for detecting the pressure of the air to be supplied from the output port to the air cylinder and a pressure gauge for indicating the pressure of the air.

Furthermore, in the present invention, it is desirable that the housing have a rectangular parallelepiped shape elongated in the front-rear direction, three valve holes extending along a first axis and a second axis, which extend in parallel in the front-rear direction of the housing, be provided in the housing, a first spool of the first solenoid valve be slidably accommodated in a first valve hole formed along the first axis, and a second spool of the second solenoid valve be slidably accommodated in a second valve hole located on the rear side of the housing, and a third spool of the soft start valve be slidably accommodated in a third valve hole located on the front side of the housing, among the second valve hole and the third valve hole formed along the second axis.

In the present invention, it is desirable that: the housing include a body block at the center, a rear cover attached to a rear end of the body block, and a front plate and a front cover attached to a front end; the body block be provided with the input port, the output port, the first spool, the second spool, the third spool, and the pressure gauge; the rear cover be provided with the exhaust port; the first pilot valve of the first solenoid valve, the second pilot valve of the second solenoid valve, the first sensor, and the second sensor be attached to the front plate; and the front cover covers the first pilot valve, the second pilot valve, the first sensor, and the second sensor, and the front cover be provided with a connector to which an electric wire for power supply and signals is to be connected.

Advantageous Effects of Invention

According to the present invention, because a residual pressure exhaust air circuit and a residual pressure exhaust valve are configured to be able to detect a malfunction of solenoid valves with a single pressure sensor without using a solenoid valve with a limit switch, a sequencer, or the like, the configuration is very simple, the equipment cost is low, and there is no need to obtain an engineer who is familiar with a sequencer program. Furthermore, because residual pressure in an air device can be immediately exhausted in the case of a malfunction of the solenoid valve, the safety is also excellent.

DESCRIPTION OF EMBODIMENTS

Figure 1:
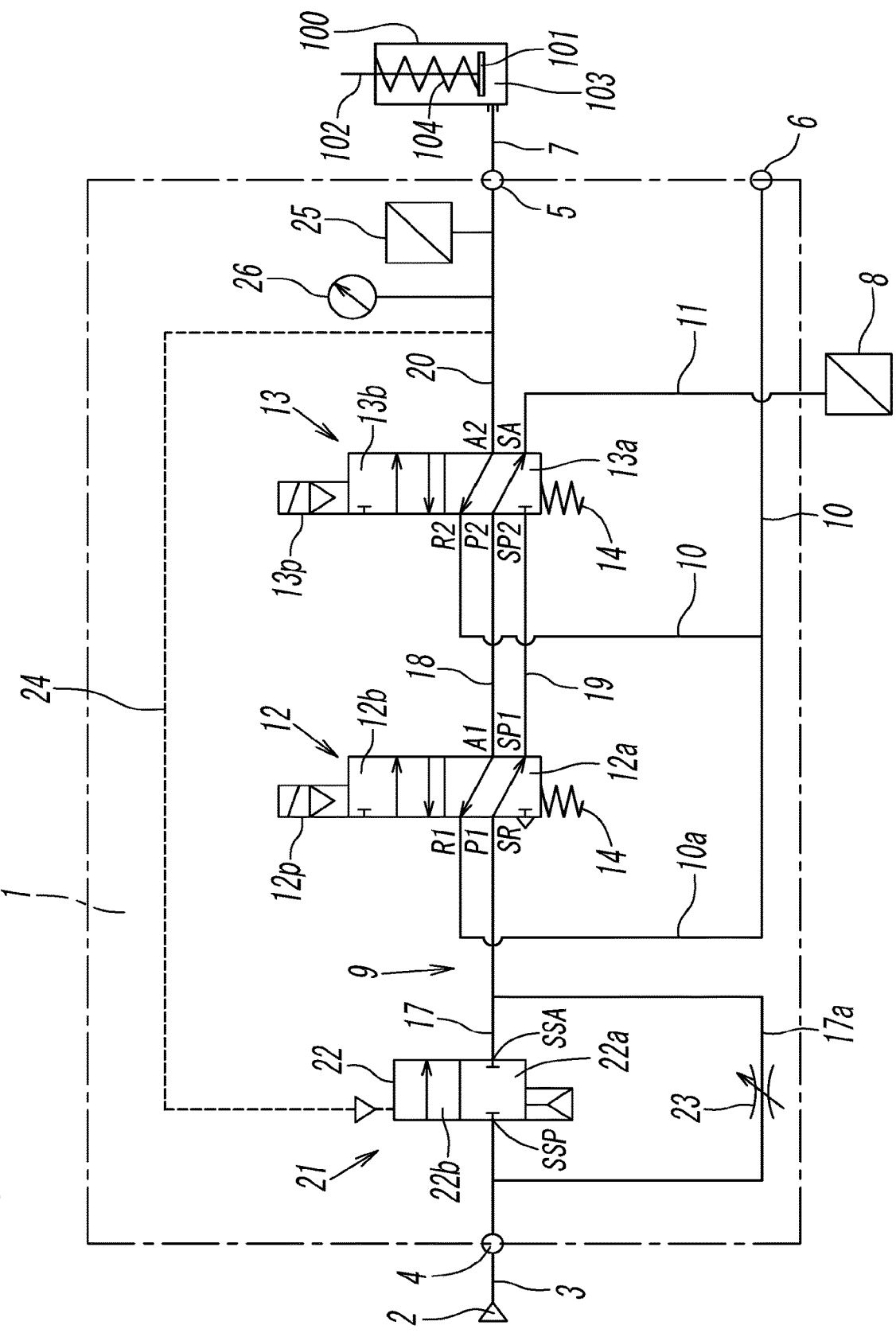
FIG. 1 is a circuit diagram of a residual pressure exhaust air circuit according to the present invention, showing an operation state in which solenoid valves are off.

FIGS. 1 to 5 show circuit diagrams of a residual pressure exhaust air circuit with a malfunction detection function, according to the present invention. The residual pressure exhaust air circuit 1 is formed by providing: an input port 4 connected, through an input pipe 3, to an air source 2 for supplying compressed air; an output port 5 connected, through an output pipe 7, to an air cylinder 100, which is one type of air device; an exhaust port 6 opening to the outside; a first sensor 8 for detecting a malfunction of solenoid valves 12 and 13 by the action of air; a main flow path 9 that connects the input port 4 and the output port 5 when the air from the air source 2 is supplied to the air cylinder 100; an exhaust flow path 10 that connects the output port 5 and the exhaust port 6 when the air in the air cylinder 100 is exhausted; a detection flow path 11 that connects the input port 4 and the first sensor 8 when the solenoid valve 12 or 13 malfunctions; and the two solenoid valves 12 and 13 for switching the communication states of the main flow path 9, the exhaust flow path 10, and the detection flow path 11.

The air cylinder 100 is a single-acting air cylinder in which a piston 101 and a rod 102 are reciprocated by the air supplied to a pressure chamber 103 and a return spring 104.

The two solenoid valves 12 and 13 are internal-pilot-operated two-position five-port spool valves, which have solenoid-operated pilot valves 12p and 13p and are switched between first positions 12a and 13a (see FIG. 1) at the time of OFF (non-energized time) and second positions 12b and 13b (see FIG. 2) at the time of ON (energized time) by pilot air, supplied and discharged by on-off operation of the pilot valves 12p and 13p, and return springs 14. The two solenoid valves 12 and 13 are on-off controlled in synchronization with each other by a controller (not shown).

Figure 2:
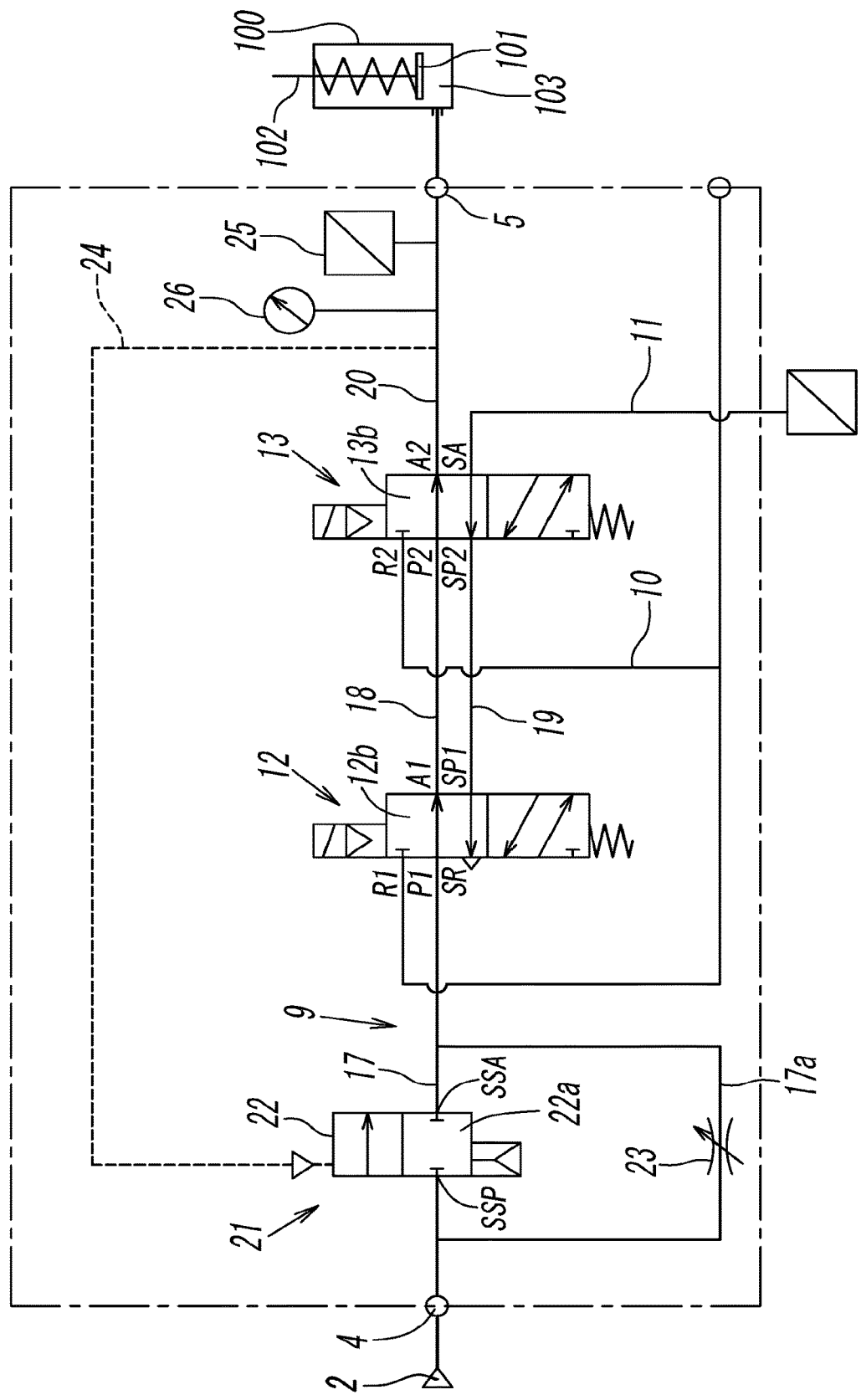
FIG. 2 is a circuit diagram showing another operation state of the residual pressure exhaust air circuit.

Of the two solenoid valves 12 and 13, the first solenoid valve 12, which is connected to the main flow path 9 at a position closer to the input port 4 (air source 2), has an inlet port P1, an outlet port A1, an exhaust port R1, a detection port SP1, and a detection exhaust port SR. As shown in FIG. 1, when the first solenoid valve 12 is located at the first position 12a, the inlet port P1 and the detection port SP1 communicate with each other, and the exhaust port R1 and the outlet port A1 communicate with each other. As shown in FIG. 2, when the first solenoid valve 12 is switched to the second position 12b, the inlet port P1 and the outlet port A1 communicate with each other, and the detection exhaust port SR and the detection port SP1 communicate with each other.

The second solenoid valve 13, which is disposed at a position in the main flow path 9 closer to the output port 5 (air cylinder 100), has an inlet port P2, an outlet port A2, an exhaust port R2, a detection port SP2, and a detection outlet port SA. As shown in FIG. 1, when the second solenoid valve 13 is located at the first position 13a, the inlet port P2 and the detection outlet port SA communicate with each other, and the exhaust port R2 and the outlet port A2 communicate with each other. As shown in FIG. 2, when the second solenoid valve 13 is switched to the second position 13b, the inlet port P2 and the outlet port A2 communicate with each other, and the detection port SP2 and the detection outlet port SA communicate with each other.

The inlet port P1 of the first solenoid valve 12 is connected to the input port 4 through an input flow path 17 constituting a part of the main flow path 9, the outlet port A1 of the first solenoid valve 12 is connected to the inlet port P2 of the second solenoid valve 13 through a first communication path 18, the detection port SP1 of the first solenoid valve 12 is connected to the detection port SP2 of the second solenoid valve 13 through a second communication path 19, and the exhaust port R1 of the first solenoid valve 12 is connected to the exhaust flow path 10 through an exhaust branch flow path 10a.

The outlet port A2 of the second solenoid valve 13 is connected to the output port 5 through an output flow path 20, the detection outlet port SA of the second solenoid valve 13 is connected to the first sensor 8 through the detection flow path 11, and the exhaust port R2 of the second solenoid valve 13 is connected to the exhaust port 6 through the exhaust flow path 10.

The output flow path 20 constitutes a part of the main flow path 9 when the air from the air source 2 is supplied to the air cylinder 100 and constitutes a part of the exhaust flow path 10 when the air in the air cylinder 100 is exhausted. Similarly, the first communication path 18 constitutes a part of the main flow path 9 when the air from the air source 2 is supplied to the air cylinder 100 and constitutes a part of the detection flow path 11 when the solenoid valve 12 or 13 malfunctions.

A soft start valve 21 for soft-starting the air cylinder 100 is connected to the main flow path 9.

The soft start valve 21 is formed by connecting, in parallel, a switching valve 22 and a throttle valve 23 for limiting the flow rate of air and is connected to the input flow path 17, between the first solenoid valve 12 and the input port 4.

Figure 3:
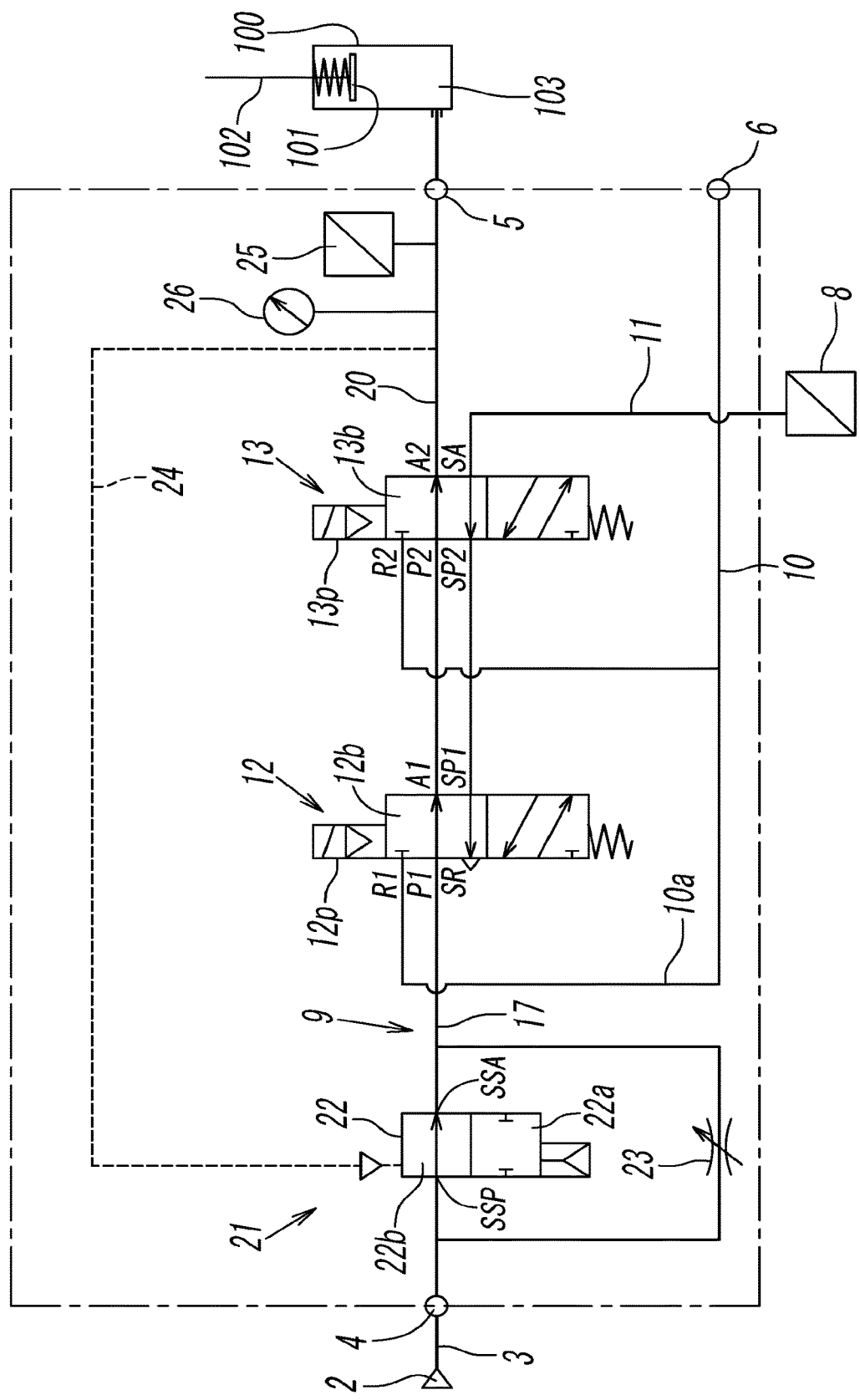
FIG. 3 is a circuit diagram showing still another operation state of the residual pressure exhaust air circuit.

The switching valve 22 is a normally closed two-port spool valve and has an inlet port SSP and an outlet port SSA. Although the switching valve 22 is normally positioned at a first position 22a (OFF position), as shown in FIG. 1, where the inlet port SSP and the outlet port SSA are disconnected, to shut off (close) the input flow path 17, when a portion of the air to be supplied from the output flow path 20 to the air cylinder 100 is fed back through a feedback flow path 24 connected to the output flow path 20, the switching valve 22 is switched to a second position 22b (ON position), as shown in FIG. 3, where the inlet port SSP and the output flow path SSA communicate with each other, to open (communicate) the input flow path 17.

The throttle valve 23 is a variable throttle valve in which the flow-path sectional area can be adjusted, and is connected to an input branch path 17a that bypasses the switching valve 22.

Next, the operation of the residual pressure exhaust air circuit will be described.

FIG. 1 shows a state in which both the first solenoid valve 12 and the second solenoid valve 13 are off and occupy the first positions 12a and 13a to shut off the main flow path 9.

At this time, the air from the air source 2 is not supplied to a pressure chamber 103 of the air cylinder 100, and the air in the pressure chamber 103 is exhausted from the exhaust port 6 through the exhaust flow path 10 as a result of the output flow path 20 being connected to the exhaust flow path 10 through the second solenoid valve 13. Therefore, the air cylinder 100 is in a state in which the piston 101 and the rod 102 are pushed by the return spring 104 and retracted to the initial position.

Furthermore, because the detection flow path 11 is connected to the exhaust port 6 through the second solenoid valve 13, the first communication path 18, the first solenoid valve 12, the exhaust branch flow path 10a, and the exhaust flow path 10, the air in the detection flow path 11 is also exhausted, and no air is supplied to the first sensor 8.

Furthermore, the switching valve 22 of the soft start valve 21 is located at the first position 22a to shut off the input flow path 17. The air bypassing the switching valve 22 through the throttle valve 23 is not supplied to the pressure chamber 103 of the air cylinder 100 because the main flow path 9 is shut off by the first solenoid valve 12 and the second solenoid valve 13.

As shown in FIG. 2, when the first solenoid valve 12 and the second solenoid valve 13 are simultaneously turned on and switched to the second positions 12b and 13b from this state, the input flow path 17, the first communication path 18, and the output flow path 20 communicate. As a result, the air from the air source 2 is gradually supplied to the pressure chamber 103 of the air cylinder 100 in a state in which the flow rate thereof is limited by the throttle valve 23, and the piston 101 starts to slowly advance toward the working position as the air pressure in the pressure chamber 103 increases.

At this time, a portion of the air in the output flow path 20 is fed back to the switching valve 22 of the soft start valve 21 through the feedback flow path 24, switching the switching valve 22 to the second position 22b, as shown in FIG. 3, after soft-starting of the piston 101 is started. As a result, the air from the air source 2 is supplied to the pressure chamber 103 of the air cylinder 100 through the switching valve 22 in a free flow state in which the flow rate is not limited. Hence, the piston 101 advances to the working position at an increased speed.

At this time, the pressure chamber 103 of the air cylinder 100 is not exhausted because the exhaust flow path 10 is shut off from the output port 5 by the first solenoid valve 12 and the second solenoid valve 13, and no air is supplied to the first sensor 8 because the detection flow path 11 is also shut off from the input port 4 by the first solenoid valve 12 and the second solenoid valve 13.

Note that, as shown in FIG. 1, it is also possible to connect a second sensor 25 to the output flow path 20 to measure the pressure of the air output from the output port 5 to the air cylinder 100 with this second sensor 25. Furthermore, it is also possible to connect a pressure gauge 26 to the output flow path 20 and to configure such that the pressure gauge 26 indicates the air pressure.

Subsequently, when the two pilot valves 12p and 13p are simultaneously turned off from the state in FIG. 3, the two solenoid valves 12 and 13, if they operate normally, are switched to the first positions 12a and 13a, respectively, and return to the operation states shown in FIG. 1. When one of the solenoid valves 12 and 13 fails and is not switched to the first position 12a or 13a, such a situation is detected as a malfunction by the first sensor 8, as will be described below, and, at the same time, the air in the pressure chamber 103 of the air cylinder 100 is exhausted to ensure the safety.

Figure 4:
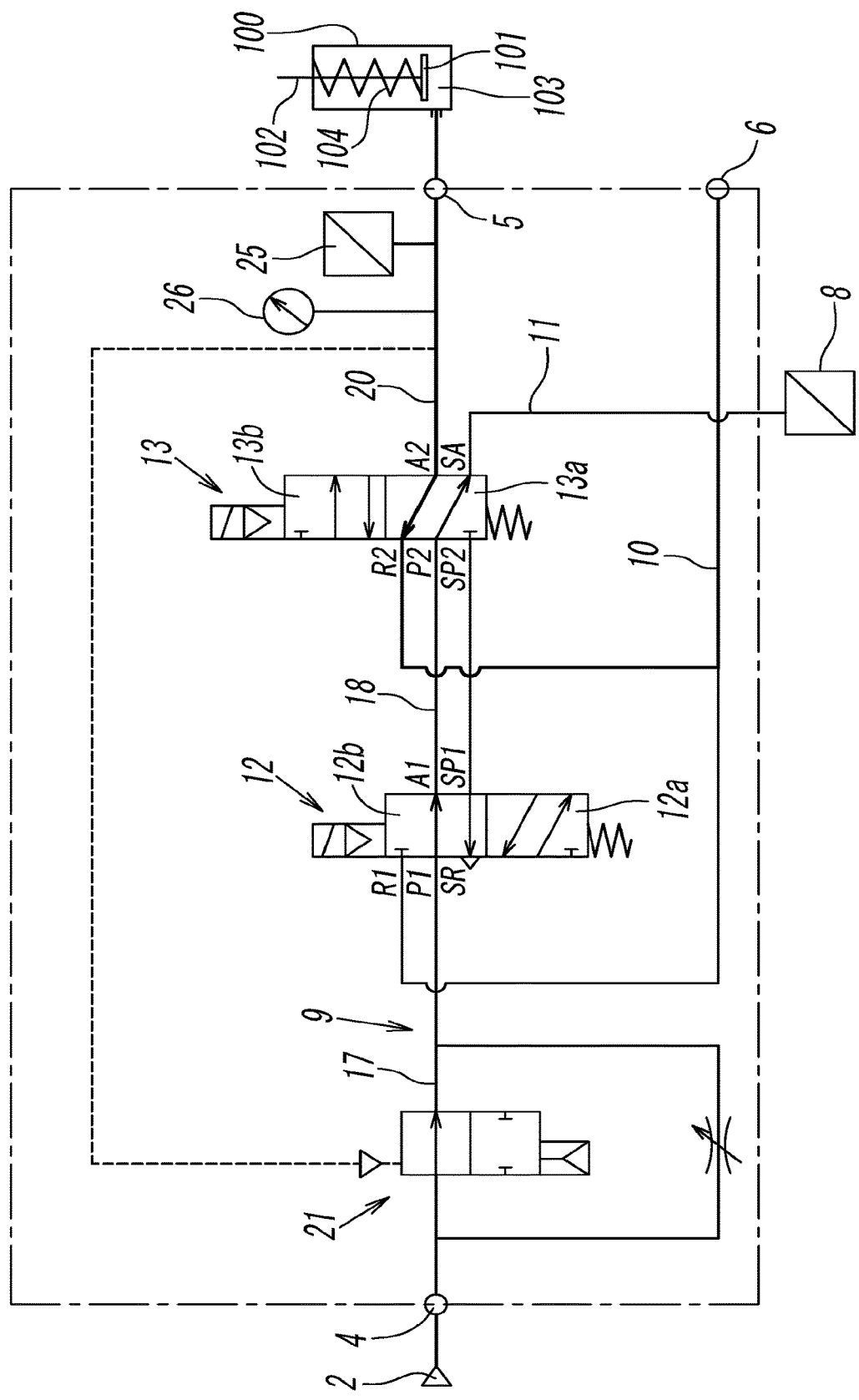
FIG. 4 is a circuit diagram showing still another operation state of the residual pressure exhaust air circuit.

First, as shown in FIG. 4, in the case where the first solenoid valve 12 fails and remains at the second position 12b and the second solenoid valve 13 operates normally and returns to the first position 13a, the detection flow path 11 leading to the first sensor 8 is connected to the input flow path 17 through the second solenoid valve 13, the first communication path 18, and the first solenoid valve 12, allowing the air from the air source 2 to be supplied to the first sensor 8 through the detection flow path 11. As a result, the first sensor 8 outputs a detection signal to the control device, and based on the detection signal, a state in which the two solenoid valves 12 and 13 do not operate in synchronization with each other (operation inconsistency) is detected as a malfunction.

At the same time, because the output flow path 20 is connected to the exhaust flow path 10 via the second solenoid valve 13, the air in the pressure chamber 103 of the air cylinder 100 is exhausted from the exhaust flow path 10 to the outside through the exhaust port 6, and the piston 101 of the air cylinder 100 returns to the initial position by the force of the return spring 104.

Figure 5:
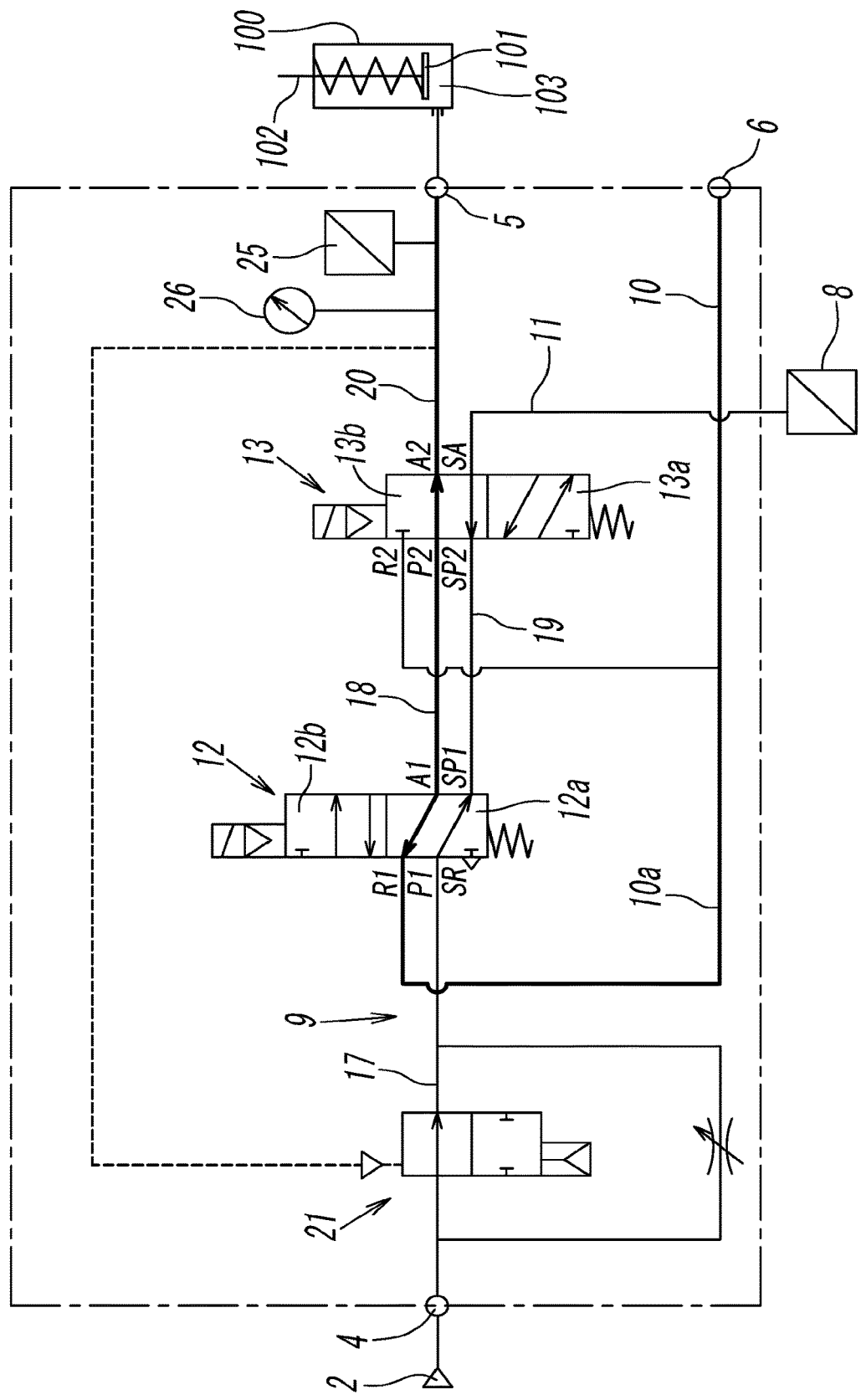
FIG. 5 is a circuit diagram showing still another operation state of the residual pressure exhaust air circuit.

As shown in FIG. 5, when the first solenoid valve 12 operates normally and returns to the first position 12a, and the second solenoid valve 13 fails and remains at the second position 13b, the detection flow path 11 is connected to the input flow path 17 through the second solenoid valve 13, the second communication path 19, and the first solenoid valve 12, so that the air from the air source 2 is supplied to the first sensor 8 through the detection flow path 11. Hence, the first sensor 8 outputs a detection signal to the control device, and based on this detection signal, a state in which the two solenoid valves 12 and 13 do not operate in synchronization with each other, i.e., operation inconsistency, is detected as a malfunction.

At the same time, because the output flow path 20 is connected to the exhaust flow path 10 through the second solenoid valve 13, the first communication path 18, the first solenoid valve 12, and the exhaust branch flow path 10a, the air in the pressure chamber 103 of the air cylinder 100 is exhausted to the outside from the exhaust port 6 through the output flow path 20, the second solenoid valve 13, the first communication path 18, the first solenoid valve 12, the exhaust branch flow path 10a, and the exhaust flow path 10, returning the piston 101 of the air cylinder 100 to the initial position.

As described above, in the case where one of the two solenoid valves 12 and 13 fails, the failure can be reliably detected by the first sensor 8, and, at the same time, the air in the pressure chamber 103 of the air cylinder 100 can be immediately exhausted to ensure the safety. However, it is impossible to detect which of the solenoid valves 12 and 13 has failed.

FIGS. 6 to 13 show a residual pressure exhaust valve 90 formed by incorporating elements constituting the air circuit 1 in FIG. 1 in a single housing 30.

Figure 6:
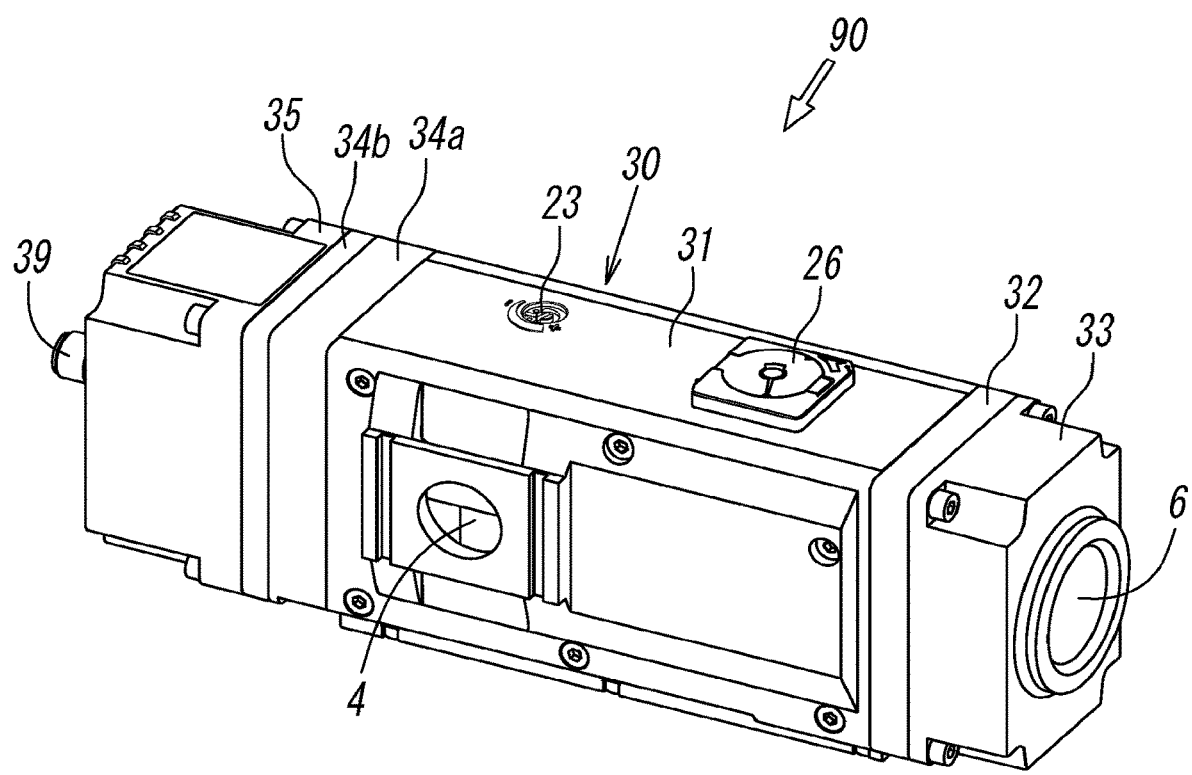
FIG. 6 is a perspective view of a residual pressure exhaust valve according to the present invention.
Figure 7:
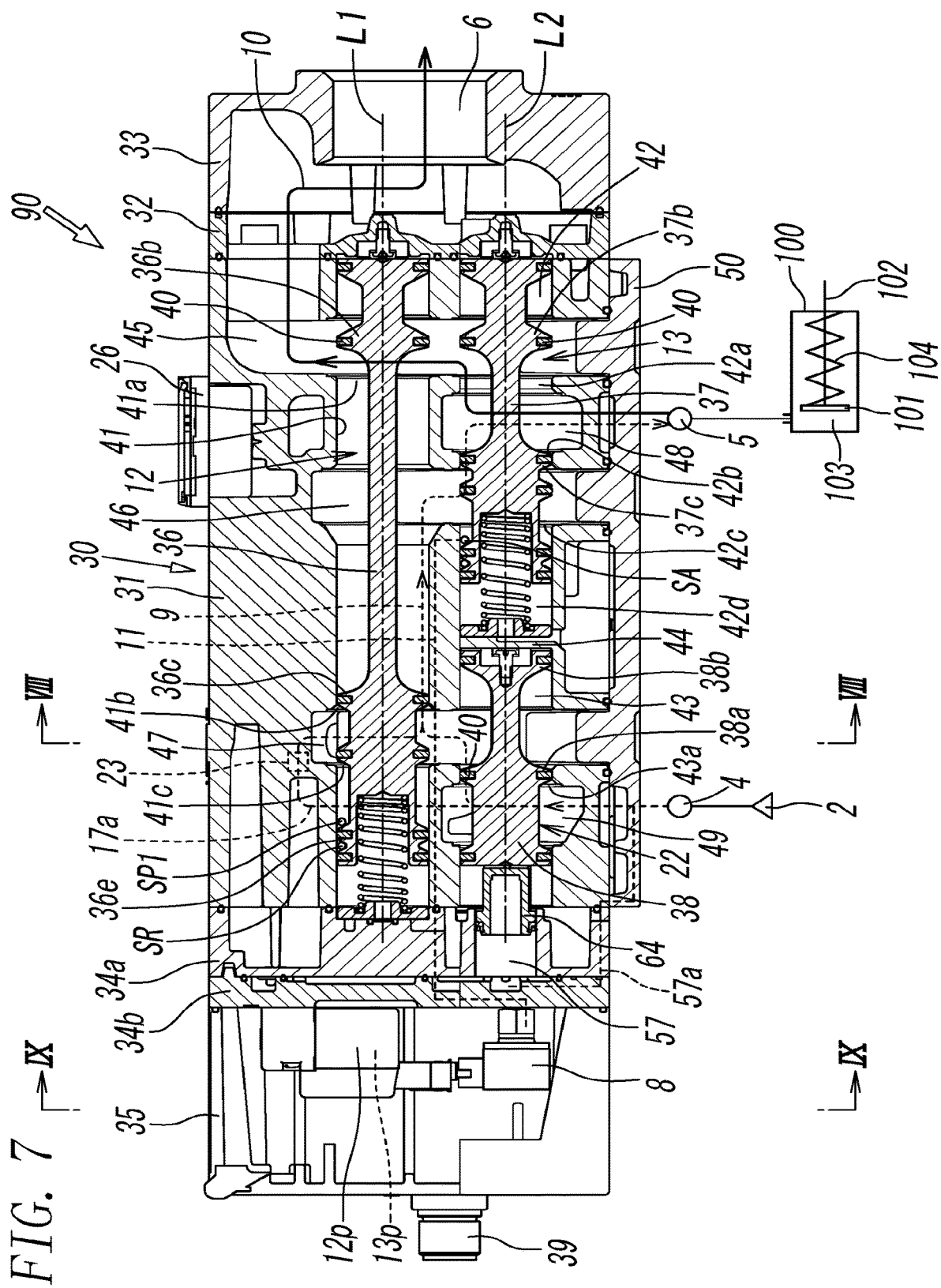
FIG. 7 is a vertical sectional view of the residual pressure exhaust valve in FIG. 6, taken at positions of two solenoid valves and a switching valve, showing a state in which the two solenoid valves and the switching valve are all at first positions at the time of OFF.

As shown in FIGS. 6 and 7, the housing 30 has a rectangular parallelepiped shape elongated in the front-rear direction and includes a body block 31 at the center, a rear plate 32 and a rear cover 33 attached to the rear end of the body block 31, and front plates 34a and 34b and a front cover 35 attached to the front end of the body block 31.

Figure 8:
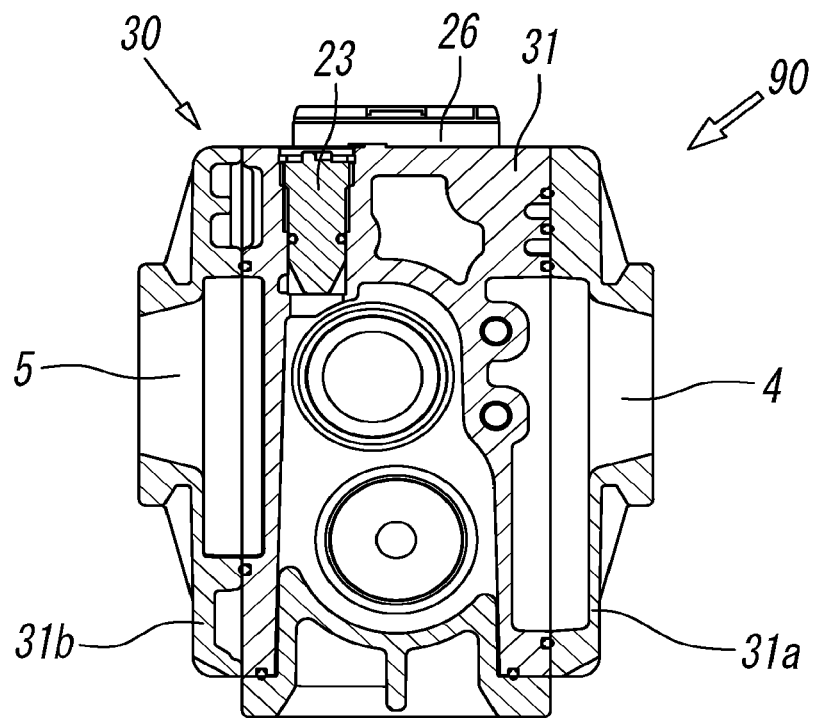
FIG. 8 is a sectional view taken along line VIII-VIII in FIG. 7.

As is apparent from FIG. 8, the body block 31 is provided with the input port 4 in one first side surface 31a and the output port 5 in the other second side surface 31b. As shown in FIG. 7, a first spool 36 of the first solenoid valve 12, a second spool 37 of the second solenoid valve 13, and a third spool 38 of the switching valve 22 constituting the soft start valve 21 are provided inside the body block 31. As shown in FIG. 8, the throttle valve 23 is provided so as to be able to adjust the flow rate by being moved forward and backward from the upper-surface side of the body block 31, and the pressure gauge 26 is attached to the upper surface of the body block 31.

Figure 9:
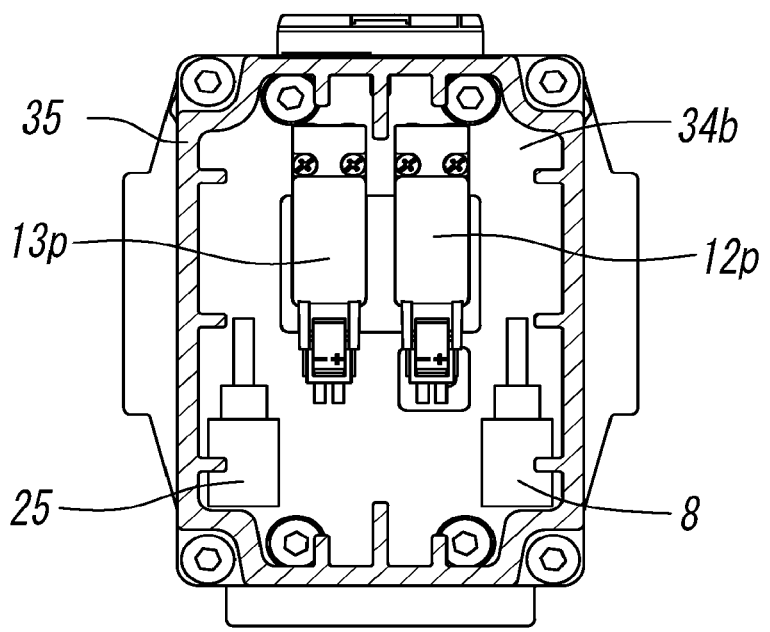
FIG. 9 is a sectional view taken along line IX-IX in FIG. 7.

Furthermore, the exhaust port 6 is formed in the rear cover 33, and the first pilot valve 12p of the first solenoid valve 12, the second pilot valve 13p of the second solenoid valve 13, the first sensor 8, and the second sensor 25 are attached to the front plate 34b, as shown in FIG. 9. The first pilot valve 12p, the second pilot valve 13p, the first sensor 8, and the second sensor 25 are covered by the front cover 35, and the front cover 35 is provided with a connector 39 to which an electric wire for power supply and signals is to be connected.

As is apparent from FIG. 7, in order to incorporate the first spool 36, the second spool 37, and the third spool 38 into the body block 31, three valve holes 41, 42, and 43 are formed inside the body block 31 along a first axis L1 and a second axis L2, which are parallel to each other and extend in the longitudinal direction (front-rear direction) of the housing 30. The first spool 36 is slidably accommodated in the first valve hole 41 formed along the first axis L1, the second spool 37 is slidably accommodated in the second valve hole 42, which is located on the rear side of the housing 30, and the third spool 38 is slidably accommodated in the third valve hole 43, which is located on the front side of the housing 30, among the second valve hole 42 and the third valve hole 43 formed along the second axis L2. The second valve hole 42 and the third valve hole 43 are partitioned by a partition wall 44.

Furthermore, inside the body block 31, a first recessed groove 45 and a second recessed groove 46 crossing the first valve hole 41 and the second valve hole 42, and a third recessed groove 47 crossing the first valve hole 41 and the third valve hole 43 are formed so as to extend from the bottom surface of the body block 31 toward the upper-surface side. The bottom portions of the recessed grooves are closed by a lid plate 50 attached to the bottom surface of the body block 31.

Furthermore, a fourth recessed groove 48 crossing the second valve hole 42 is formed at a position between the first recessed groove 45 and the second recessed groove 46, and a fifth recessed groove 49 crossing the third valve hole 43 is formed at a position closer to the front end side of the body block 31 than the third recessed groove 47. The valve holes 41, 42, and 43 and the recessed grooves 45, 46, 47, 48, and 49 constitute portions of the main flow path 9, the exhaust flow path 10, and the detection flow path 11.

Figure 12:
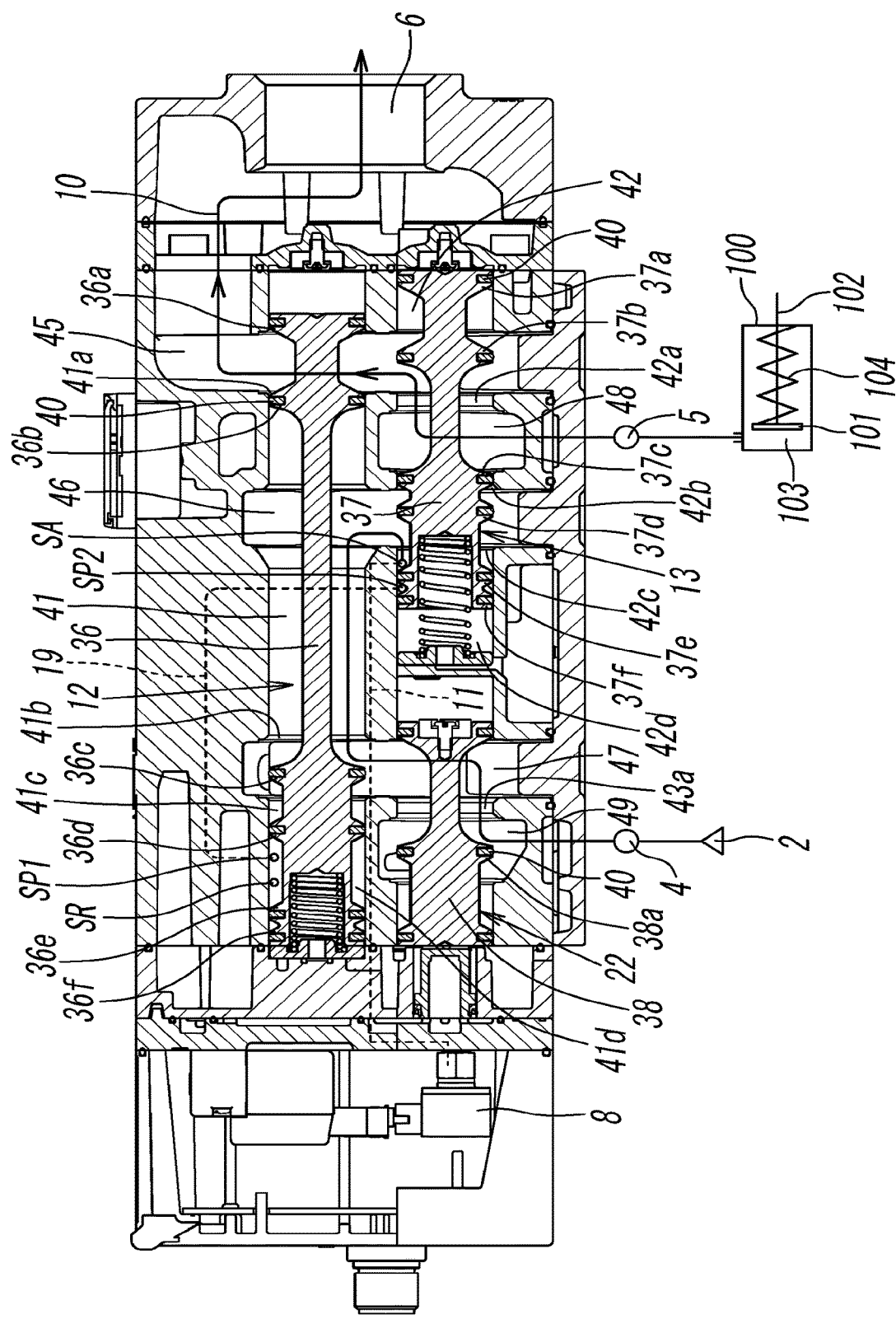
FIG. 12 is a sectional view showing a state in which the second solenoid valve has been turned off and returned to the first position from the state in FIG. 11.

As shown in detail in FIG. 12, the first spool 36 has six lands, namely, first to sixth lands 36a, 36b, 36c, 36d, 36e, and 36f, to the outer circumferences of which seal members 40 are attached. Among them, the first land 36a and the sixth land 36f provided at the ends of the first spool 36 seal the ends of the first valve hole 41, the second land 36b opens and closes a first opening 41a formed at a portion where the first valve hole 41 communicates with the first recessed groove 45, the third land 36c opens and closes a second opening 41b formed at a portion where the first valve hole 41 communicates with the third recessed groove 47, the fourth land 36d opens and closes a third opening 41c formed at a portion where a relay chamber 41d at the end of the first valve hole 41 communicates with the third recessed groove 47, and the fifth land 36e communicates (see FIG. 12) and shuts off (see FIG. 7) between the detection port SP1 and the detection exhaust port SR, which are open in the relay chamber 41d.

The detection port SP1 communicates with the detection port SP2 formed in a relay chamber 42d of the second solenoid valve through the second communication path 19 formed in the housing 30.

Figure 10:
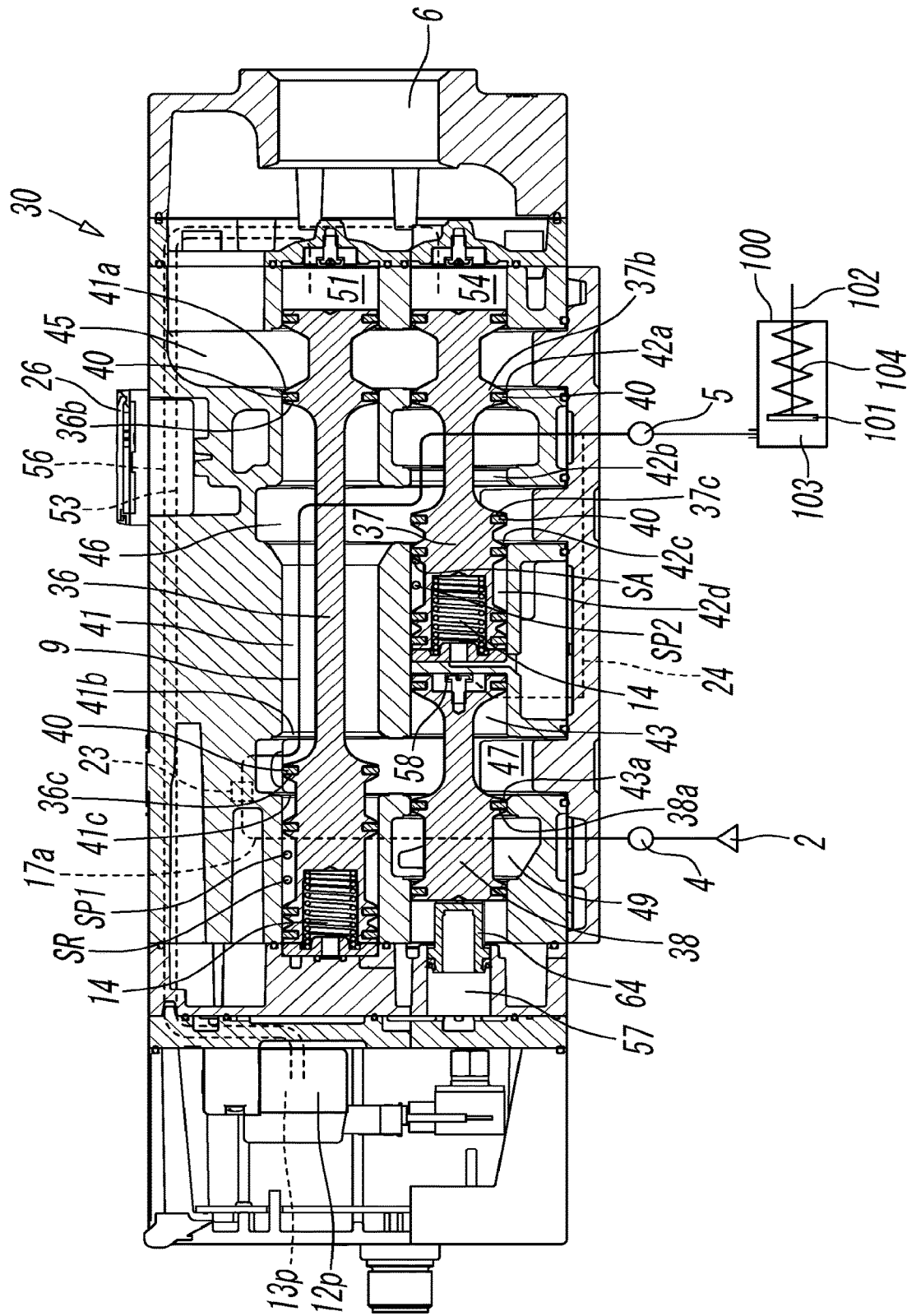
FIG. 10 is a sectional view showing a state in which the two solenoid valves have been turned on and switched to second positions from the state in FIG. 7.

As shown in FIG. 10, a first pilot pressure chamber 51 and a return spring 14 are provided at one end and the other end of the first spool 36, and the first pilot pressure chamber 51 communicates with the first pilot valve 12P through a first pilot flow path 53 formed in the housing 30.

When the first pilot valve 12p is not energized and thus is in the off state, the first spool 36 is pushed by the return spring 14 to occupy the first position in FIG. 7, opening the first opening 41a and the third opening 41c, closing the second opening 41b, and shutting the detection port SP1 and the detection exhaust port SR from each other with the fifth land 36e.

When the first pilot valve 12p is energized and turned on, the first spool 36 is switched to the second position by the pilot air supplied to the first pilot pressure chamber 51 through the first pilot flow path 53, as shown in FIG. 10, closing the first opening 41a and the third opening 41c and opening the second opening 41b. At this time, the detection port SP1 is shut off from the third recessed groove 47, and the detection port SP1 and the detection exhaust port SR communicate with each other.

As shown in detail in FIG. 12, the second spool 37 has six lands, namely, seventh to twelfth lands 37a, 37b, 37c, 37d, 37e, and 37f, to the outer circumferences of which seal members 40 are attached. Among them, the seventh land 37a and the twelfth land 37f provided at the ends of the second spool 37 seal the ends of the second valve hole 42, the eighth land 37b opens and closes a fourth opening 42a formed at a portion of the second valve hole 42 communicating between the first recessed groove 45 and the fourth recessed groove 48, the ninth land 37c opens and closes a fifth opening 42b formed at a portion of the second valve hole 42 communicating between the second recessed groove 46 and the fourth recessed groove 48, the tenth land 37d opens and closes a sixth opening 42c communicating between the relay chamber 42d at the end of the second valve hole 42 and the second recessed groove 46, and the eleventh land 37e communicates and shuts off between the detection outlet port SA and the detection outlet port SP2, which are open in the relay chamber 42d. The detection outlet port SA is connected to the first sensor 8 through the detection flow path 11 formed in the housing 30.

Furthermore, a second pilot pressure chamber 54 and a return spring 14 are provided at one end and the other end of the second spool 37, and the second pilot pressure chamber 54 is connected to the second pilot valve 13P through a second pilot flow path 56 (see FIG. 10) formed in the housing 30.

When the second pilot valve 13p is not energized and thus is in the off state, the second spool 37 is pushed by the return spring 14 to occupy the first position in FIG. 7, opening the fourth opening 42a, closing the fifth opening 42b, and opening the sixth opening 42c to make the relay chamber 42d (and thus, the detection outlet port SA) communicate with the second recessed groove 46. Furthermore, the detection outlet port SA and the detection port SP2 are shut off from each other by the eleventh land 37e.

On the other hand, when the second pilot valve 13p is energized and turned on, the second spool 37 is switched to the second position by the pilot air supplied to the second pilot pressure chamber 54 through the second pilot flow path 56, as shown in FIG. 10, closing the fourth opening 42a and the sixth opening 42c and opening the fifth opening 42b to allow the detection outlet port SA and the detection port SP2 to communicate with each other in the relay chamber 42d.

Figure 13:
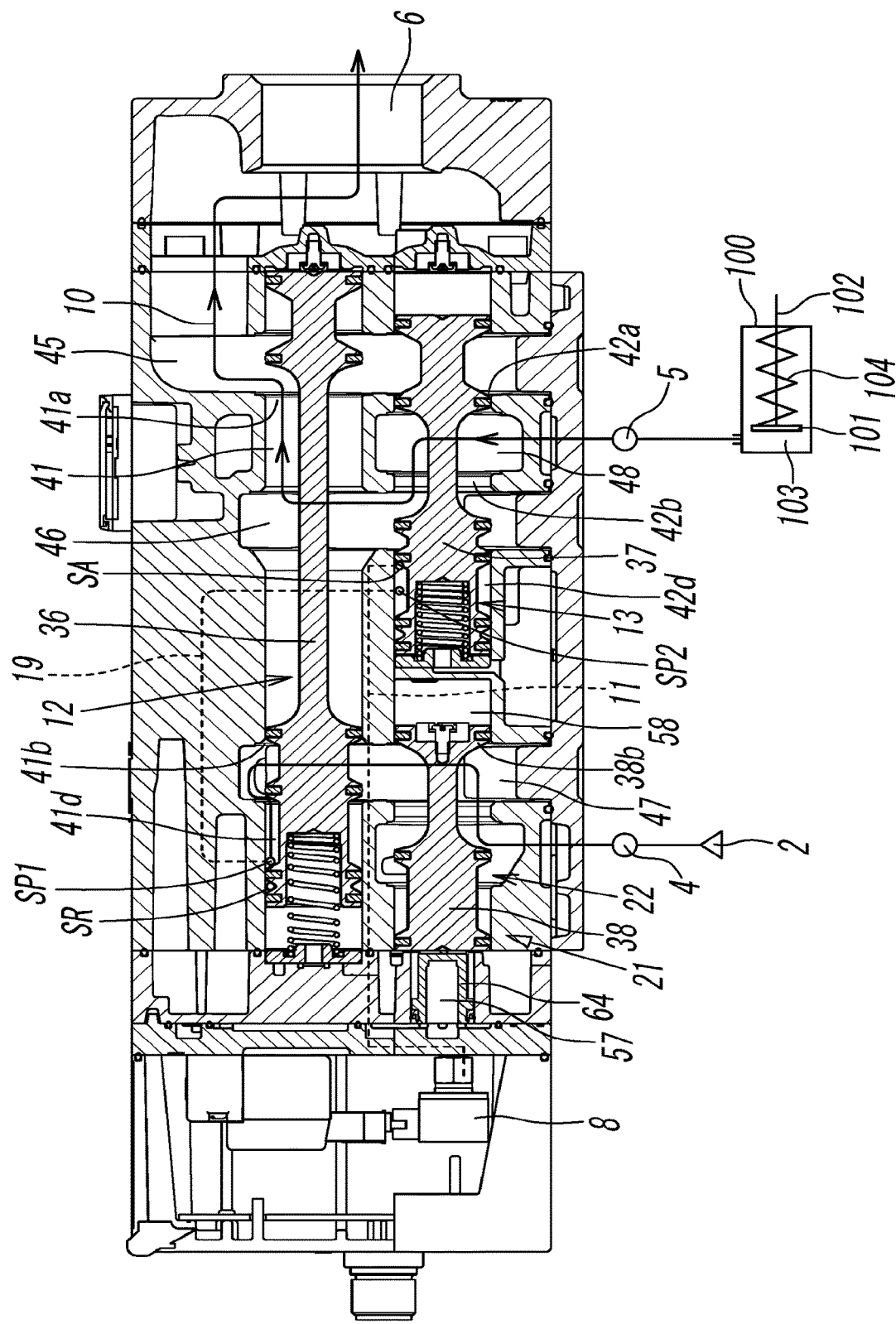
FIG. 13 is a sectional view showing a state in which the first solenoid valve has been turned off and returned to the first position from the state in FIG. 11.
Figure 14:
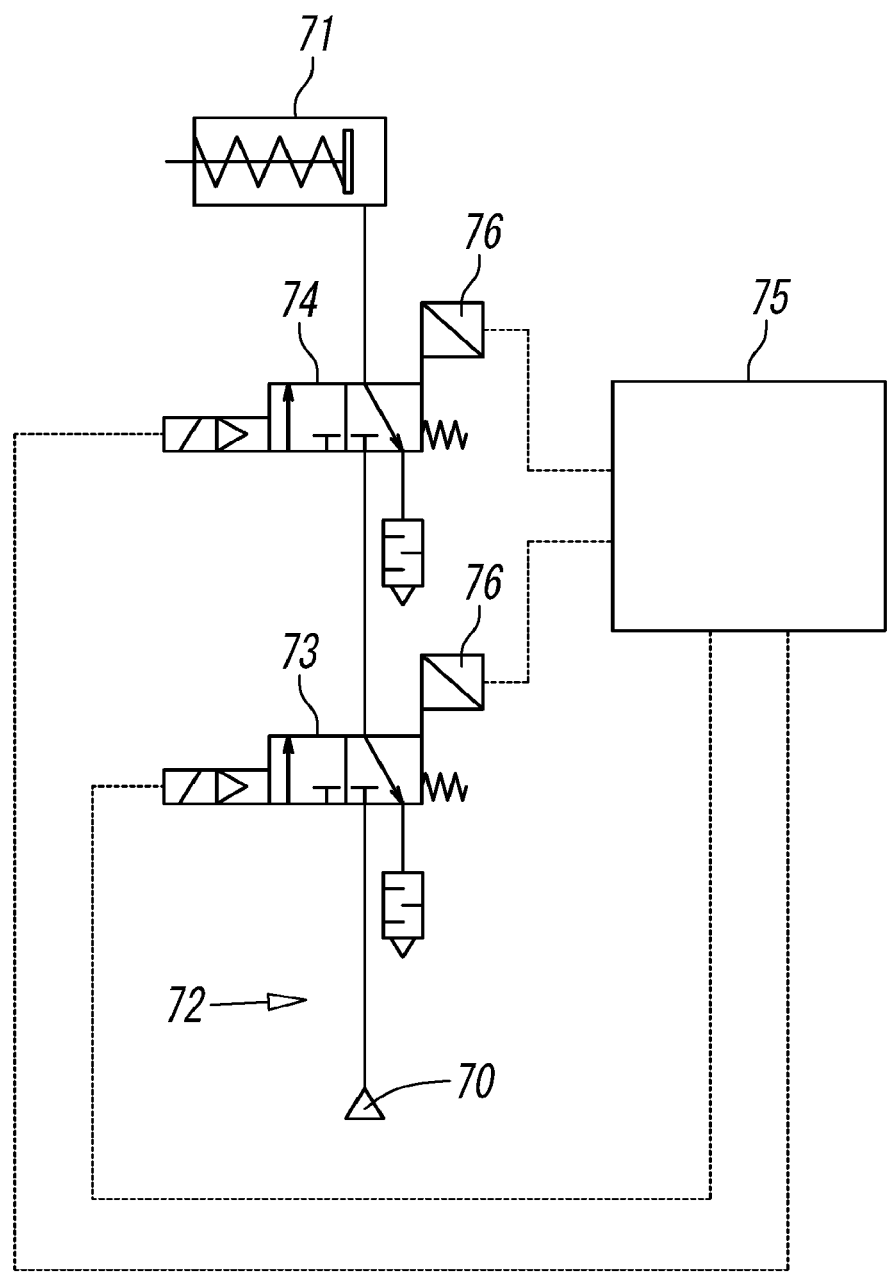
FIG. 14 is a diagram of a known air control circuit.

Furthermore, as shown in FIGS. 7 and 13, the third spool 38 has a thirteenth land 38a, and the thirteenth land 38a opens and closes, with a seal member 40, a seventh opening 43a in the third valve hole 43 connecting the third recessed groove 47 and the fifth recessed groove 49. At one end and the other end of the third spool 38, a large-diameter piston portion 38b integral with the third spool 38 and a small-diameter piston 64 separate from the third spool 38 are provided, and a third pilot pressure chamber 57 facing the small-diameter piston 64 and a feedback pressure chamber 58 facing the large-diameter piston portion 38b are formed, respectively. The pressure receiving area of the large-diameter piston portion 38b is larger than the pressure receiving area of the small-diameter piston 64. The third pilot pressure chamber 57 communicates with the input port 4 through a pilot supply path 57a, and the feedback pressure chamber 58 communicates with the output port 5 through the feedback flow path 24 (see FIG. 10).

The third spool 38 of the switching valve 22 in the soft start valve 21 normally occupies the first position in FIG. 7 by the action of the pilot air supplied to the third pilot pressure chamber 57 and closes the seventh opening 43a. However, when a portion of the air supplied from the output port 5 to the air cylinder 100 is fed back to the feedback pressure chamber 58 through the feedback flow path 24, the third spool 38 is switched to the second position in FIG. 11 by the action of the large-diameter piston portion 38b, opening the seventh opening 43a.

As schematically shown by a dotted arrow in FIG. 7, the main flow path 9 is formed so as to connect the input port 4 and the output port 5 via the fifth recessed groove 49, the fifth opening 43a of the soft start valve 21, the third recessed groove 47, the second opening 41b of the first solenoid valve 12, the first valve hole 41, the second recessed groove 46, the fourth opening 42b of the second solenoid valve 13, and the fourth recessed groove 48.

Note that, although, in actuality, the output port 5 is provided in the second side surface 31b of the body block 31, as shown in FIG. 8, because it is disposed on the second solenoid valve 13 side in the circuit diagrams of FIGS. 1 to 5, it is illustrated near the second solenoid valve 13 in FIGS. 7 and 10 to 13 for convenience to help better understanding when referring to these circuit diagrams.

FIG. 7 shows a state in which the soft start valve 21, the first solenoid valve 12, and the second solenoid valve 13 are all in the off state and the spools 36, 37, and 38 are located at the first positions, which is the same as the operation state in FIG. 1.

At this time, because the main flow path 9 is shut off by the soft start valve 21, the first solenoid valve 12, and the second solenoid valve 13, the air from the air source 2 is not supplied to the pressure chamber 103 of the air cylinder 100. The same applies to the air passing through the throttle valve 23. On the other hand, because the exhaust flow path 10 communicates between the output port 5 and the exhaust port 6 through the fourth recessed groove 48, the fourth opening 42a, and the first recessed groove 45, the air in the pressure chamber 103 of the air cylinder 100 is exhausted from the exhaust port 6 through the exhaust flow path 10. Therefore, the air cylinder 100 is at the initial position where the piston 101 and the rod 102 are retracted.

Furthermore, in the detection flow path 11, because the detection outlet port SA, which is open in the relay chamber 42d of the second valve hole 42, communicates with the exhaust flow path 10 through the second recessed groove 46, the first valve hole 41, and the first recessed groove 45, the air in the detection flow path 11 is also exhausted, and no air is supplied to the first sensor 8.

When both the first pilot valve 12p and the second pilot valve 13p are turned on from the state in FIG. 7, pilot air is supplied to the first pilot pressure chamber 51 and the second pilot pressure chamber 54 through a first pilot flow path 53 and a second pilot flow path 56, respectively, as shown in FIG. 10. As a result, both the first spool 36 and the second spool 37 are switched to the second positions, and the portion of the main flow path 9 passing through the first solenoid valve 12 and the second solenoid valve 13 is brought to a communicating state. This state is the same as the operation state in FIG. 2.

Figure 11:
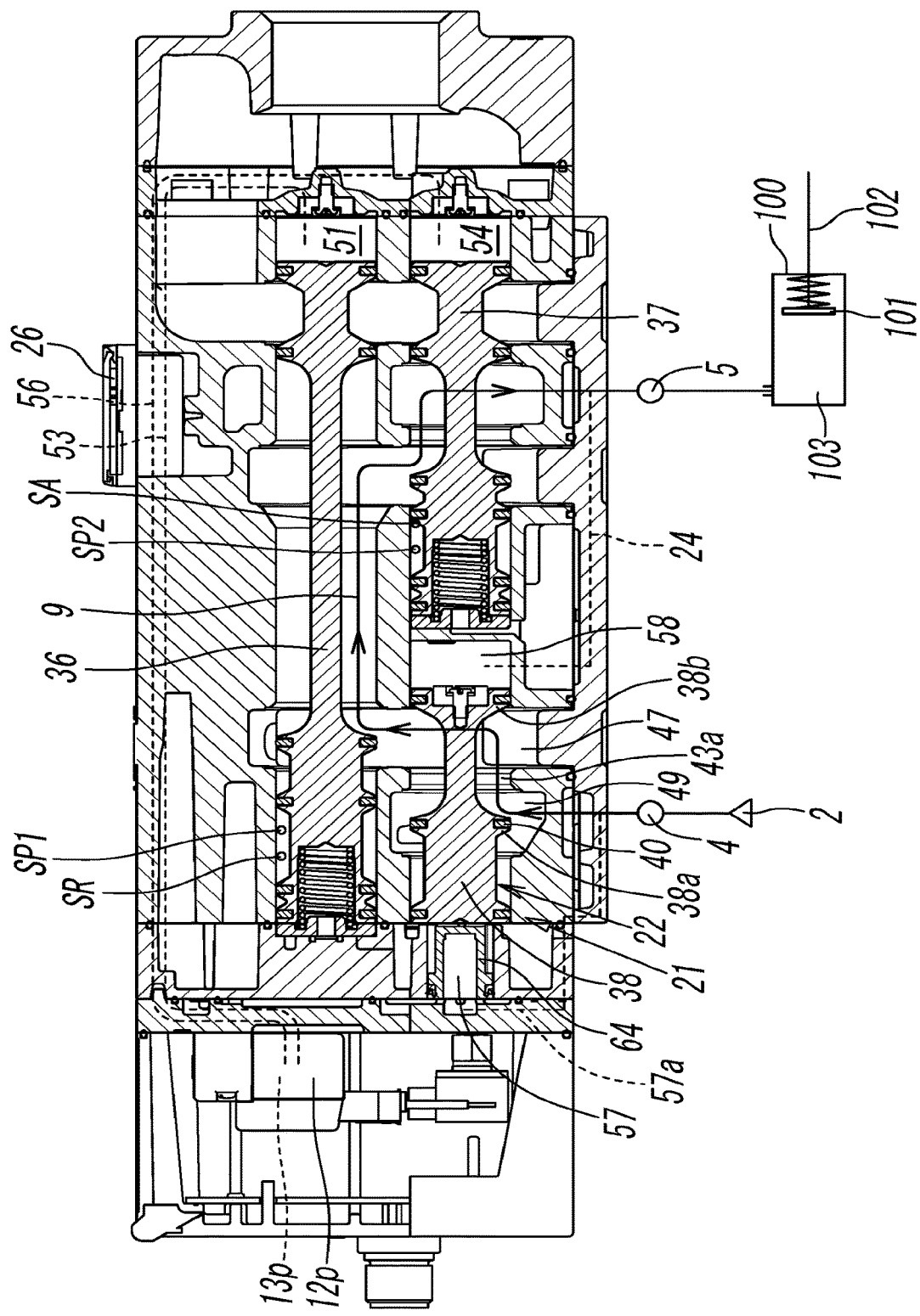
FIG. 11 is a sectional view showing a state in which the switching valve has been turned on and switched to a second position from the state in FIG. 10.

Therefore, the air from the air source 2 is gradually supplied to the pressure chamber 103 of the air cylinder 100 through the input branch path 17a and the main flow path 9 in a state in which the flow rate is restricted by the throttle valve 23, and the piston 101 starts to slowly advance toward the working position as the air pressure in the pressure chamber 103 increases. On the other hand, a portion of the air supplied to the air cylinder 100 is fed back to the feedback pressure chamber 58 through the feedback flow path 24, and the third spool 38 of the switching valve 22 of the soft start valve 21 is switched to the second position by the fed back air, as shown in FIG. 11. The operation state at this time is the same as the operation state in FIG. 3.

Because this allows the air from the air source 2 to be supplied to the pressure chamber 103 of the air cylinder 100 through the switching valve 22 in a free flow state in which the flow rate is not limited, the piston 101 and the rod 102 advance to the working position at an increased speed.

Subsequently, when the first pilot valve 12p and the second pilot valve 13p are simultaneously turned off from the state in FIG. 11, the pilot air in the first pilot pressure chamber 51 and the second pilot pressure chamber 54 is exhausted from the first pilot valve 12p and the second pilot valve 13p through the first pilot flow path 53 and the second pilot flow path 56, respectively. As a result, the first spool 36 and the second spool 37 are returned to the first position by the force of the return spring 14, as shown in FIG. 7. As a result, the supply of air to the pressure chamber 103 of the air cylinder 100 is stopped, and the air in the pressure chamber 103 is exhausted from the exhaust port 6 through the exhaust flow path 10, whereby the piston 101 and the rod 102 of the air cylinder 100 are pushed by the return spring 104 and retracted to the initial positions. The operation state at this time is the same as the operation state in FIG. 1.

However, when one of the first spool 36 and the second spool 37 fails and does not return to the first position 12a or 13a, as will be described below, the operation inconsistency between the first solenoid valve 12 and the second solenoid valve 13 is detected as a malfunction by the first sensor 8, and at the same time, the air in the air cylinder 100 is exhausted and the air cylinder 100 returns to the initial position.

First, as shown in FIGS. 12 and 4, when the first spool 36 of the first solenoid valve 12 fails and remains at the second position 12b, and the second spool 37 of the second solenoid valve 13 operates normally and returns to the first position 13a, the air from the air source 2 is shut off at the position of the second recessed groove 46 by the second solenoid valve 13 and is not supplied to the air cylinder 100. However, because the detection outlet port SA, which is open in the relay chamber 42d of the second valve hole 42, communicates with the second recessed groove 46, the air from the air source 2 is supplied from the second recessed groove 46 to the first sensor 8 through the detection outlet port SA and the detection flow path 11. As a result, the first sensor 8 outputs a detection signal to the control device, and the operation inconsistency between the two solenoid valves 12 and 13 is detected as a malfunction with this detection signal.

At the same time, the exhaust flow path 10 communicates between the output port 5 and the exhaust port 6 through the fourth recessed groove 48, the third opening 42a of the second solenoid valve 13, and the first recessed groove 45. Hence, the air in the pressure chamber 103 of the air cylinder 100 is exhausted to the outside from the exhaust port 6 through the first exhaust flow path 10, and the piston 101 and the rod 102 of the air cylinder 100 are returned to their initial positions by the force of the return spring 104.

As shown in FIGS. 13 and 5, when the second spool 37 of the second solenoid valve 13 fails and remains at the second position 13b, and the first spool 36 of the first solenoid valve 12 operates normally and returns to the first position 12a, the air from the air source 2 is shut off at the position of the third recessed groove 47 by the first solenoid valve 13 and is not supplied to the air cylinder 100. However, because the relay chamber 41d of the first valve hole 41 communicates with the third recessed groove 47, the detection port SP1, which is open in the relay chamber 41d, communicates with the third recessed groove 47. Therefore, the air from the air source 2 flows from the third recessed groove 47 through the detection port SP1, the second communication path 19, and the detection port SP2 of the second solenoid valve 13 into the relay chamber 42d of the second valve hole 42, and is supplied from the detection outlet port SA, which is open in this relay chamber 42d, through the detection flow path 11 to the first sensor 8. As a result, the first sensor 8 outputs a detection signal to the control device, and the operation inconsistency between the two solenoid valves 12 and 13 is detected as a malfunction with this detection signal.

At the same time, the exhaust flow path 10 communicates between the output port 5 and the exhaust port 6 through the fourth recessed groove 48, the fifth opening 42b of the second solenoid valve 13, the second recessed groove 46, the first valve hole 41, the first opening 41a, and the first recessed groove 45. Hence, the air in the pressure chamber 103 of the air cylinder 100 is exhausted to the outside from the exhaust port 6 through the first exhaust flow path 10, and the piston 101 and the rod 102 of the air cylinder 100 are returned to their initial positions by the force of the return spring 104.

As described above, according to the present invention, in the case where the operations of the two solenoid valves 12 and 13 are inconsistent, the inconsistency can be reliably detected as a malfunction by the single first sensor 8, and the residual pressure in the air device can be exhausted. Hence, the safety is excellent.

REFERENCE SIGNS LIST

1 Residual pressure exhaust air circuit
2 Air source
4 Input port
5 Output port
6 Exhaust port
8 First sensor
9 Main flow path
10 Exhaust flow path
11 Detection flow path
12 First solenoid valve
12a First position
12b Second position
13 Second solenoid valve
13a First position
13b Second position
21 Soft start valve
22 Switching valve
23 Throttle valve
25 Second sensor
26 Pressure gauge
30 Housing
31 Body block
33 Front cover
34b Rear plate
35 Rear cover
36 First spool
37 Second spool
38 Third spool
39 Connector
41 First valve hole
42 Second valve hole
41 Third valve hole
90 Residual pressure exhaust valve
100 Residual pressure exhaust air circuit

The invention claimed is:

1. A residual pressure exhaust air circuit, comprising:
a main flow path through which air from an air source is supplied to an air cylinder;
an exhaust flow path through which the air in the air cylinder is exhausted;
a first sensor for detecting with the air a malfunction of solenoid valves; and
a detection flow path through which air from the air source is supplied to the first sensor, and two solenoid valves that switch communication states among the main flow path, the exhaust flow path, and the detection flow path, wherein the two solenoid valves are two-position valves having first positions at the time of OFF and second positions at the time of ON and are synchronously ON/OFF controlled, when the two solenoid valves are both at the first positions, the main flow path is shut off so that the supply of air to the air cylinder is stopped, and the air cylinder and the detection flow path are connected to the exhaust flow path so that the air cylinder and the detection flow path are in an exhaust state, when the two solenoid valves are both at the second positions:
the main flow path is in a communicating state so that the air from the air source is supplied only to the air cylinder through the main flow path,
the exhaust flow path and the detection flow path are each shut off so that the exhaust of air from the air cylinder through the exhaust flow path and the supply of air to the first sensor through the detection flow path are each stopped, and
communication between each of the main flow path, exhaust flow path, and the detection flow path are all shut off, when one of the two solenoid valves is at the first position and the other is at the second position, the main flow path is shut off so that the supply of air to the air cylinder is stopped, the exhaust flow path is connected to the air cylinder so that the air in the air cylinder is exhausted through the exhaust flow path, and the detection flow path is connected to the air source so that the air from the air source is supplied to the first sensor, whereby operation inconsistency between the two solenoid valves is detected as a malfunction by the first sensor, and when one of the two solenoid valves fails, a position of one of the two solenoid valves at the first position is maintained and a position of the other of the two solenoid valves at the second position is maintained.

2. The residual pressure exhaust air circuit according to claim 1, wherein
a soft start valve is connected to the main flow path, and the soft start valve is formed by connecting, in parallel, a switching valve operated by air and a throttle valve for limiting a flow rate of air and soft-starts the air cylinder by supplying air with limited flow rate to the air cylinder through the throttle valve when the two solenoid valves are both turned on and the air source and the air cylinder are connected through the main flow path, and, when a part of the air in the main flow path is fed back to the switching valve, the switching valve is switched, and the air from the air source is supplied to the air cylinder in a free flow state.

3. The residual pressure exhaust air circuit according to claim 1, wherein
the one of the two solenoid valves is a first solenoid valve connected to the main flow path at a position closer to the air source, and the other of the two solenoid valves is a second solenoid valve connected to the main flow path at a position closer to the air cylinder, and
the exhaust flow path exhausts the air in the air cylinder through the second solenoid valve when the first solenoid valve fails, and exhausts the air in the air cylinder through the first solenoid valve via the second solenoid valve when the second solenoid valve fails.

4. The residual pressure exhaust air circuit according to claim 1, wherein a second sensor for detecting the pressure of the air to be supplied to the air cylinder and a pressure gauge for indicating the pressure of the air are connected to the main flow path.

5. A residual pressure exhaust valve comprising:
a housing is provided with an input port connected to an air source, an output port connected to an air cylinder, and an exhaust port open to the outside;
a main flow path connecting the input port and the output port, an exhaust flow path connecting the output port and the exhaust port;
a detection flow path connecting the input port and a first sensor, the first sensor for detecting a malfunction of two solenoid valves by the action of air supplied through the detection flow path, the two solenoid valves that switch communication states among the main flow path, the exhaust flow path, and the detection flow path; and
a soft start valve for soft-starting the air cylinder, wherein
the two solenoid valves are two-position valves having first positions at the time of OFF and second positions at the time of ON and are synchronously ON/OFF controlled,
when the two solenoid valves are both at the first positions, the main flow path is shut off so that the supply of air to the air cylinder is stopped, and the air cylinder and the detection flow path are connected to the exhaust flow path so that the air cylinder and the detection flow path are in an exhaust state,
when the two solenoid valves are both at the second positions:
  the main flow path is in a communicating state so that the air from the air source is only supplied to the air cylinder through the main flow path,
  the exhaust flow path and the detection flow path are each shut off so that the exhaust of air from the air cylinder through the exhaust flow path and the supply of air to the first sensor through the detection flow path are each stopped, and
  communication between each of the main flow path, exhaust flow path, and the detection flow path are all shut off,
when one of the two solenoid valves is at the first position and the other is at the second position, the main flow path is shut off so that the supply of air to the air cylinder is stopped, the exhaust flow path is connected to the air cylinder so that the air in the air cylinder is exhausted through the exhaust flow path, and the detection flow path is connected to the air source so that the air from the air source is supplied to the first sensor, whereby operation inconsistency between the two solenoid valves is detected as a malfunction by the first sensor, and
when one of the two solenoid valves fails, a position of one of the two solenoid valves at the first position is maintained and a position of the other of the two solenoid valves at the second position is maintained.

6. The residual pressure exhaust valve according to claim 5, wherein
the housing is provided with a second sensor for detecting the pressure of the air to be supplied from the output port to the air cylinder and a pressure gauge for indicating the pressure of the air.

7. The residual pressure exhaust valve according to claim 6, wherein the housing has a rectangular parallelepiped shape elongated in a front-rear direction,
three valve holes extending along a first axis and a second axis, which extend in parallel in the front-rear direction of the housing, are provided in the housing,
a first spool of the first solenoid valve is slidably accommodated in a first valve hole formed along the first axis,
a second spool of the second solenoid valve is slidably accommodated in a second valve hole located on a rear side of the housing, and
a third spool of the soft start valve is slidably accommodated in a third valve hole located on a front side of the housing, among the second valve hole and the third valve hole formed along the second axis.

8. The residual pressure exhaust valve according to claim 7, wherein
the housing includes a body block at the center, a rear cover attached to a rear end of the body block, and a front plate and a front cover attached to a front end,
the body block is provided with the input port, the output port, the first spool, the second spool, the third spool, and the pressure gauge,
the rear cover is provided with the exhaust port,
a first pilot valve of the first solenoid valve, a second pilot valve of the second solenoid valve, the first sensor, and the second sensor are attached to the front plate, and
the front cover covers the first pilot valve, the second pilot valve, the first sensor, and the second sensor, and the front cover is provided with a connector to which an electric wire for power supply and signals is to be connected.

9. The residual pressure exhaust valve according to claim 5, wherein
the housing has a rectangular parallelepiped shape elongated in a front-rear direction,
three valve holes extending along a first axis and a second axis, which extend in parallel in the front-rear direction of the housing, are provided in the housing,
a first spool of the first solenoid valve is slidably accommodated in a first valve hole formed along the first axis,
a second spool of the second solenoid valve is slidably accommodated in a second valve hole located on a rear side of the housing, and
a third spool of the soft start valve is slidably accommodated in a third valve hole located on a front side of the housing, among the second valve hole and the third valve hole formed along the second axis.

10. The residual pressure exhaust valve according to claim 9, wherein
the housing includes a body block at the center, a rear cover attached to a rear end of the body block, and a front plate and a front cover attached to a front end,
the body block is provided with the input port, the output port, the first spool, the second spool, the third spool, and a pressure gauge,
the rear cover is provided with the exhaust port,
a first pilot valve of the first solenoid valve, a second pilot valve of the second solenoid valve, the first sensor, and a second sensor are attached to the front plate, and
the front cover covers the first pilot valve, the second pilot valve, the first sensor, and the second sensor, and the front cover is provided with a connector to which an electric wire for power supply and signals is to be connected.

* * * * *